United States Patent [15] 3,643,706

Ritchie [45] Feb. 22, 1972

[54] PROXIMITY CONTROL APPARATUS

[72] Inventor: Edwin E. Ritchie, Bainbridge Island, Wash.

[73] Assignee: Wyott Corporation

[22] Filed: Apr. 30, 1971

[21] Appl. No.: 138,982

Related U.S. Application Data

[62] Division of Ser. No. 850,967, Aug. 18, 1969, Pat. No. 3,601,621.

[52] U.S. Cl. ................................141/160, 141/167, 141/183
[51] Int. Cl. ................................................B65b 57/02
[58] Field of Search ................................141/129, 155–157, 141/159, 160, 167, 183, 192, 351, 83; 198/37

[56] References Cited

UNITED STATES PATENTS 3,033,248 5/1962 Ritchie ..................................141/351
3,145,741 8/1964 Smith..................................141/160 X
3,280,860 10/1966 Schneider et al. .......................141/160
3,448,778 6/1969 Ramsay ..................................141/83

*Primary Examiner*—Edward J. Earls
*Attorney*—Allen & Chromy

[57] ABSTRACT

An electronic control responsive to the presence of an object in predetermined proximity to the probe thereof. The probe is connected to an oscillation generator which supplies electrical oscillations to a circuit which controls the initiation of the timing cycle of a timing device when an object is brought into proximity of the probe and electrical oscillations supplied by the generator are interrupted. The timing device supplies a signal to a control circuit after a predetermined timed interval to shut off the load circuit which was activated when the timing cycle was started.

2 Claims, 2 Drawing Figures

PATENTED FEB 22 1972 3,643,706

INVENTOR
EDWIN E. RITCHIE

BY
Allen and Chromy
ATTORNEYS

PROXIMITY CONTROL APPARATUS

This application is a division of my application, Ser. No. 850,967 filed Aug. 18, 1969 for PROXIMITY CONTROL APPARATUS now U.S. Pat. No. 3,601,621.

This invention relates to an electronic control that is responsive to the presence of an object in predetermined proximity thereto.

An object of this invention is to provide an improved electronic control which initiates a timing cycle when an object is brought into the proximity of the probe thereof and which stops the timing cycle after a predetermined timed interval even though the object is not removed from the proximity of the probe.

Another object of this invention is to provide an improved electronic control which may be used to dispense or control the dispensing of various amounts of quantities of liquids or solids and which is provided with an adjustable control so that a desired quantity dispensed may be controlled or varied.

Another object of this invention is to provide an improved electronic control employing an oscillation generator equipped with a sensor such that when an object is brought into the proximity of the sensor, generation of oscillations is interrupted and a timing device and a load circuit are activated, said timing device being provided with a control which deactivates the load circuit after the predetermined timed interval to which the timing device is adjusted.

Other and further objects of this invention will be apparent to those skilled in the art to which it relates from the following specification, claims and drawings.

In accordance with this invention there is provided an improved electronic control of the type which is responsive to the presence of an object in predetermined proximity thereto. This invention is similar to that disclosed in my prior U.S. Pat. No. 3,033,248 and includes improvements and features not disclosed in this prior patent.

The present invention employs a Hartley-type oscillation generator which is provided with a field effect transistor having high impedance characteristics. This transistor amplifier is connected with a feedback circuit so that high frequency oscillations are generated thereby. The circuit is adjusted so that it is just barely above the point of sustained oscillation. Thus, very tiny amounts of absorbed energy from the sensor or probe can actively block oscillation of the circuit. A pickup coil is inductively coupled to the oscillator tank circuit and when the tank circuit is in oscillation a radio frequency voltage is induced into this coil and rectified by a suitable diode which supplies a voltage of positive polarity to the gate of a silicon controlled rectifier that is connected across a full wave rectifier which supplies DC to a timing device or circuit only when the silicon controlled rectifier is in nonconducting condition. Thus, when the oscillation generator goes off, that is when an object approaches or is placed in proximity of the probe or sensor, the full wave rectifier supplies a DC voltage to the timing device and also to the gate of another silicon controlled rectifier which is connected in series with the load controlling device which may be a switching device such as a relay or a solenoid for controlling a heating circuit or valve. After a predetermined time interval to which the timing device is adjusted a signal is supplied to turn this silicon controlled rectifier off and interrupt the load circuit.

Other features and details of this invention will be set forth in the following specification, claims and drawing, in which:

Figures 1, 2:
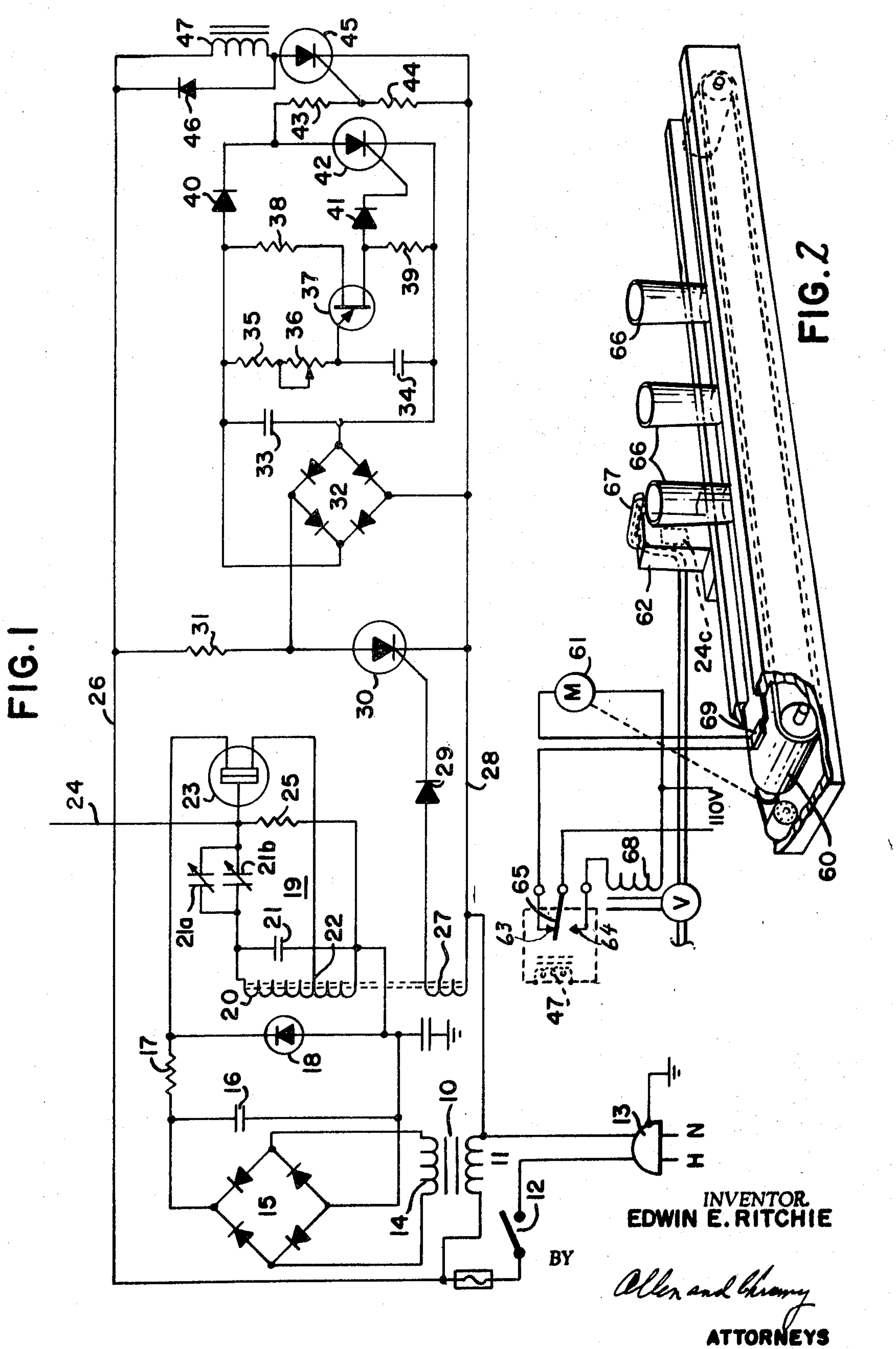
FIG. 1 is a schematic wiring diagram of the electrical circuit employed in this invention.
FIG. 2 is a view of a motor driven conveyor and liquid dispensing station associated therewith which are provided with an electronic control in accordance with this invention to dispense liquids to containers on the conveyor.

Referring to the drawing detail, reference numeral 10 designates a transformer having a primary winding 11 which is adapted to be connected to the conventional wall plug 13 of a suitable current supply through a manually controlled switch 12 of conventional construction. The transformer 10 is also provided with a low voltage secondary 14 which is connected across the full wave rectifier 15. Filter capacitor 16 is connected across the output of the rectifier 15 and current limiting resistor 17 is connected in series with the output. A zener diode 18 is provided across the DC output and functions to hold this output to a constant voltage.

The Hartley-type oscillation generator 19 is provided with a tank inductance coil 20. The capacitor 21 is connected across this coil and the tap 22 thereof is connected to the drain electrode of the transistor 23 which is of the field effect type. Variable capacitors *21a* and *21b* are connected in parallel with one side thereof connected to the control electrode of the field effect transistor. These capacitors may be considered as a single admittance capacitor whose sole function is to admit and also limit electrical oscillations fed to the input of the field effect transistor 23 from the tank circuit. One of these capacitors may be adjusted by a plastic extension provided thereto for setting the value of this capacitor and adjusting the oscillation generating circuit so that it is just barely above the point of sustained oscillation.

The probe 24 is connected to the base electrode of transistor 23 and a resistor 25 of relatively high value is connected between this electrode and the bottom terminal of the tank circuit including the inductance 20 and capacitor 21.

A pickup coil 27 is coupled to the tank coil 20. One side of this pickup coil is connected to the ground line 28 while the other side is connected to the diode 29 and to the gate of the silicon controlled rectifier 30. The silicon controlled rectifier 30 and resistor 31 are connected in series between the lines 26 and 28 which are connected to the wall plug 13. Thus, these lines supply the conventional 115 volt AC supply across rectifier 30 and resistor 31. The common connection between rectifier 30 and resistor 31 is connected to one side of the input of full wave rectifier 32 and the other side of the input of this rectifier is connected to the ground line 28. Thus, the silicon controlled rectifier 30 is connected across the input of the full wave rectifier 32 and when this rectifier is in conducive condition it functions to shunt or bypass the input of the full wave rectifier 32.

The output of rectifier 32 is connected across the filter capacitor 33 and also across the RC circuit which includes the capacitor 34 and resistors 35 and 36 which are part of the timing circuit. Resistor 36 is made variable so that the timing interval may be adjusted as desired. The common connection between resistor 36 and capacitor 34 is connected to the emitter electrode of the unijunction transistor 37. The base electrodes of transistor 37 are connected to the resistors 38 and 39, respectively, and through these resistors across the output of the full wave rectifier 32.

Thus, when the capacitor 34 of the timing circuit is charged to a predetermined voltage such as to fire the transistor 37 this capacitor is discharged through this transistor and through resistor 39. At the same time an electric pulse is supplied to the anode of diode 41 and through this diode to the gate of silicon controlled rectifier 42. Diode 40 and silicon controlled rectifier 42 are connected in series across the output of full wave rectifier 32, and the common connection between diode 40 and rectifier 42 is connected to the gate of silicon controlled rectifier 45 through resistor 43. Resistors 43 and 44 are connected in series and the common connection between these resistors is connected to the gate of silicon controlled rectifier 45. Rectifier 45 is connected in series with the solenoid 47 and these two devices are connected in series across the AC supply lines 26 and 28. Thus, when the gate of silicon controlled rectifier 45 is fired by current flowing through diode 40 and rectifier 42, rectifier 45 supplies rectified AC to the solenoid 47. A diode 46 is shunted around the winding solenoid 47 to bypass induced voltages such as may be induced therein by its collapsing magnetic field. Solenoid 47 may be the winding of a relay or it may be the winding of a solenoid valve.

Silicon controlled rectifier 42 is turned on by a very short pulse supplied to the gate electrode thereof by the unijunction transistor 37 through the diode 41. Silicon control rectifier 42 is latched in its "on" condition as long as direct current is supplied thereto from the rectifier 32. The direct current supplied to the rectifier 42 from full wave rectifier 32 is interrupted when the object is removed from the proximity of the probe or sensor 24 so that the oscillation generator resumes the production of high frequency oscillations which are supplied to the pickup coil 27 and rectified by the diode 29 to be impressed upon the gate electrode of silicon controlled rectifier 30.

When rectifier 30 is activated, it acts as a shunt across the input of the full wave rectifier 32 and the supply of DC on the output of this rectifier 32 is interrupted so that the flow of current through silicon controlled rectifier 42 is also interrupted. Rectifier 42 then becomes a high impedance shunt around resistors 43 and 44 and one of diodes of full wave rectifier 32. Consequently, when the next object is brought in proximity of the probe or sensor 24 and the generation of oscillations by the generator 19 is interrupted, the impedance of rectifier 30 is increased and current then flows from between lines 26 and 28 through resistor 31 and the input of the full wave rectifier 32. The DC output of rectifier 32 is then supplied to the timing circuit including the capacitor 34 and resistors 35 and 36. At the same time, the DC from the output of rectifier 32 is supplied through diode 40 and resistor 43 to the gate of silicon controlled rectifier 45. Current then flows through the solenoid 47 and rectifier 45 from the AC lines 26 and 28. Solenoid 47 is then energized at the beginning of the timing cycle, the length of which is determined by the RC circuit including the capacitor 34 and the resistors 35 and 36.

When the capacitor 34 is charged, transistor 37 is turned on and a pulse is supplied from this transistor through silicon diode 41 to the gate of silicon controlled rectifier 42. When rectifier 42 becomes conducting, it shunts resistors 43 and 44 through one of the diodes of full wave rectifier 32 and thus is instrumental in turning silicon controlled rectifier 45 off at the end of the timing cycle. Thus solenoid 47 is turned off at the end of the timing cycle even through the object which is placed in proximity of the probe or sensor 24 is not removed therefrom. On the other hand, if the object placed in the proximity of the probe or sensor 24 is removed before the timing cycle is completed, generator 19 resumes the generation of electrical oscillations and rectifier 30 is turned on so that the full wave rectifier 32 is deactivated. Thus the DC to the gate of silicon controlled rectifier 45 is interrupted and solenoid 47 is turned off before the end of the timing cycle.

In FIG. 2 there is shown an embodiment of this invention in which the electronic circuit shown in FIG. 1 is employed to control the conveyor motor 61 and the liquid dispensing station 62. The winding 47 in this case controls a relay having normally closed contacts and normally open contacts. The relay is provided with an armature 65 which engages the contact 63 to form the normally closed contacts through which electric current is supplied to the motor 61 from the conventional 115 volt AC supply. The motor 61 is arranged to drive the conveyor 60 on which spaced receptacles such as glass containers 66 are positioned. Thus the motor 61 drives the conveyor 60 and when one of the containers 66 approaches the sensor or probe 24c of the liquid dispensing station 62, the electronic circuit shown in FIG. 1 functions as previously described to energize the winding 47. The magnetic field set up by this winding moves the relay armature 65 down to contact 64 and away from the normally closed contact 63 so that the electric current supplied to the motor 61 is interrupted. At the same time, the solenoid 68 which controls the liquid supply valve is energized and the valve is opened so that the fluid flows through the pipeline connected to the spigot 67 and into the receptacle 66 positioned under this spigot. After a time interval determined by the timing device of FIG. 1, the solenoid 47 is deenergized. The current to valve solenoid 68 is then interrupted and the motor 61 is turned on since the armature 65 of the relay is released and moves into contact with the relay contact 63 away from contact 64. Motor 61 is then turned on and actuates the conveyor 60 to bring the next receptacle or container 66 into alignment with the spigot 67. It will be noted that in this instance the probe or sensor plate 24c is positioned slightly out of alignment with the spigot 67 in the direction of travel of the conveyor 60. The purpose of this is to allow the conveyor 60 to move the container 66 directly under the spigot 67 before stopping. A limit switch 69 is connected in series with the motor 61 and this limit switch is positioned near the end of the conveyor. This limit switch is normally closed and it is adapted to be open when a filled container 66 comes in contact therewith so that the motor 61 is stopped at this time to prevent moving the filled container 66 off of the conveyor and accidentally spilling the contents thereof.

The oscillation generator 19 may be adjusted to produce electric oscillations of various frequencies simply by varying the inductance and capacity of the tank circuit. In the construction and operation of this invention I have found frequencies around 400 kilohertz to be very satisfactory both from the standpoint of stability of circuit operation and sensitivity of the probe field. Other higher or lower frequencies may, of course, be used if desired.

While I have shown and described certain preferred embodiments of the invention, it is apparent that the invention is capable of variation and modification from the form shown so that the scope thereof should be limited only by the proper scope of the claims appended hereto.

I claim:

1. In an electronic control responsive to the presence of an object in predetermined proximity, the combination of an oscillation generator, a probe connected to said oscillation generator to control the generation of oscillations when an object is placed in proximity to said probe, a timing device measuring a predetermined time interval, means responsive to said oscillation generator for controlling the operation of said timing device to initiate its cycle of operation, means controlling a work circuit, and means actuating said last mentioned means for said predetermined time interval in response to the operation of said timing device, said means controlling a work circuit comprises a relay having a normally closed contact connected to control the motor for a conveyor, said relay also having a normally open contact, a liquid dispensing station positioned adjacent to the conveyor, said probe being located at said station so that a receptacle carried by the conveyor adjacent said probe affects said generator so that said work circuit controlling means causes said relay to open said normally closed circuit to stop said conveyor motor and close said normally open circuit which controls said liquid dispensing station to dispense liquid to said receptacle.

2. In an electronic control responsive to the presence of an object in predetermined proximity, the combination of an oscillation generator, a probe connected to said oscillation generator to control the generation of oscillations when an object is placed in proximity to said probe, a timing device measuring a predetermined time interval, means responsive to said oscillation generator for controlling the operation of said timing device to initiate its cycle of operation, means controlling a work circuit, and means actuating said last mentioned means for said predetermined time interval in response to the operation of said timing device, said means controlling a work circuit comprises a relay having a normally closed contact connected to control a conveyor motor, said relay also having a normally open contact, a working station positioned adjacent to the conveyor, said probe being located at said station so that a food receptacle carried by the conveyor adjacent said probe affects said generator so that said work circuit controlling means causes said relay to open said normally closed circuit to stop said conveyor motor and close said normally open circuit which controls said working station during said time interval.

* * * * *